US007792025B2

(12) United States Patent
Segel et al.

(10) Patent No.: US 7,792,025 B2
(45) Date of Patent: Sep. 7, 2010

(54) MULTI-SERVICE SESSION ADMISSION CONTROL

(75) Inventors: Jonathan Dean Segel, Ottawa (CA); Bashar Said Bou-Diab, Ottawa (CA)

(73) Assignee: Alcatel Lucent, Paris (FR)

( * ) Notice: Subject to any disclaimer, the term of this patent is extended or adjusted under 35 U.S.C. 154(b) by 1204 days.

(21) Appl. No.: 11/246,285

(22) Filed: Oct. 11, 2005

(65) Prior Publication Data

US 2007/0081459 A1    Apr. 12, 2007

(51) Int. Cl.
*H04L 12/66* (2006.01)
(52) U.S. Cl. .................................. 370/230; 370/235
(58) Field of Classification Search .................. 370/389, 370/238, 254, 395, 382, 352, 230, 229, 235; 382/132; 725/134
See application file for complete search history.

(56) References Cited

U.S. PATENT DOCUMENTS

| 5,477,531 | A | 12/1995 | McKee et al. | |
|---|---|---|---|---|
| 6,404,736 | B1* | 6/2002 | Arkko et al. | 370/230 |
| 2002/0036983 | A1* | 3/2002 | Widegren et al. | 370/230.1 |
| 2002/0197996 | A1 | 12/2002 | Popovich | |
| 2004/0013119 | A1* | 1/2004 | MeLampy et al. | 370/395.21 |
| 2005/0196030 | A1* | 9/2005 | Schofield et al. | 382/132 |
| 2005/0283818 | A1* | 12/2005 | Zimmermann et al. | 725/134 |
| 2006/0007865 | A1* | 1/2006 | White et al. | 370/238 |
| 2006/0013211 | A1* | 1/2006 | Deerman et al. | 370/389 |
| 2006/0039367 | A1* | 2/2006 | Wright et al. | 370/382 |
| 2006/0245426 | A1* | 11/2006 | Rasanen | 370/389 |
| 2006/0274650 | A1* | 12/2006 | Tyagi et al. | 370/229 |
| 2008/0232360 | A1* | 9/2008 | Mihaly et al. | 370/389 |

FOREIGN PATENT DOCUMENTS

| WO | WO 01/89234 | 11/2001 |
|---|---|---|
| WO | WO 2005/071903 | 8/2005 |

OTHER PUBLICATIONS (L. Dimopoulou, et al.), On providing a Dynamic QoS Management system for IP networks, National Technical University of Athens, XP002324588, Athens, Greece Oct. 11, 2002, pp. 1-6.
Stevens et al: "TCP/IP Illustrated, vol. 1 The Protocols" pp. 85-96 TCP/IP Illustrated, Professional Computing Series, Reading MA: Addison Wesley, US vol. 1, 1994 USA.

* cited by examiner

*Primary Examiner*—Kwang B Yao
*Assistant Examiner*—Syed Bokhari
(74) *Attorney, Agent, or Firm*—Kramer & Amado P.C.

(57) ABSTRACT

A Session Admission Control (SAC) for negotiating admission control in a multi-services communications network including multicast services is described. The module distributes the admission process between a centralized decision function (SAC-PDP) and a distributed decision function (SAC-M) in a fashion that solves admission control scaling problems. The mechanism for interaction between the SAC-PDP and SAC-M is defined. Mechanisms are defined for the SAC-PDP to discover or learn the network capacity against which the admission control decisions will be made. Systems are also described for incorporating SAC-M in multicast replication points in the network, allowing multicast replication points to participate in the admission control process.

32 Claims, 3 Drawing Sheets

MULTI-SERVICE SESSION ADMISSION CONTROL

FIELD OF THE INVENTION

This invention relates to Session Admission Control (SAC) for multi-service broadband services and more particularly to methods and systems for negotiating session-specific admission control to assure the quality of session oriented services

BACKGROUND

Many new services delivered over IP/MPLS networks have certain specific quality requirements, which, if not met make the service unusable, or unacceptable. Two notable examples of such service types are realtime communications over IP, and streaming entertainment over IP. Realtime communications over IP (such as Voice over IP or VoIP) is relatively sensitive to delay and to packet loss. Moderate network quality problems will result in one party having difficulty understanding the other party on a VoIP call; severe problems will drop the communication session, sometimes all communication sessions in progress. Streaming entertainment services over IP such as multicast TV and Video on demand are sensitive to average throughput and packet loss. Moderate network quality problems will result in visual and auditory impairment; severe problems will again result in a loss of the streaming sessions. For the new services described above, it is better to not start a new service session at all, than to start one whose quality cannot be assured, or worse, whose load will result in degradation to services already in use by other customers. Controlling the start of sessions when required is the role of session admission control.

The present invention provides a session admission control solution which solves the three most significant problems of session admission control systems, namely: scaling, network capacity discovery, and incorporation of multicast service sessions. These three aspects according to the invention may be further defined as: (1) mechanisms for negotiating admission control, including the concept of a persistent resource grant referred to as a 'season ticket', (2) a calculation of network bottlenecks employing a 'discovery based' solution, and (3) an extension to IGMP smart proxy technology to allow multicast replication points, which normally have no way to say "no" to a multicast join request, thereby allowing them to participate in the admission control process.

Session Admission Control (SAC), which is a well understood and documented mechanism, can be of value in controlling the load placed on a network such that overload conditions which would degrade quality are avoided. In the extreme case, a 'tipping point' phenomenon can exist, where allowing a single new session to be established can result in catastrophic failure of all sessions currently in progress and contending for an oversubscribed resource.

In general a SAC is involved in determining the resources needed and/or available, and reserving resources for the call. Resources of interest include link bandwidth, but might also deal with Digital Signal Processors, CPU power, and memory. Several of these resources could be constrained at any one or more of the nodes the call will traverse to its destination. RSVP (Resource Reservation Protocol) is a popular IETF standard designed to support resource (such as bandwidth) reservations through networks of varying topologies and media.

Typically, multicast traffic complicates admission control because in standard multicast networks, which use the IGMP (Internet Group Management Protocol) and PIM (Protocol Independent Multicast) families of protocols, there is no way for a multicast replication point to say 'no' to a service request, and no mechanism for it to inform other service delivery points that it has enabled the session either. IGMP and PIM are widely used.

There are two main purposes for SAC, which will be expanded in following sections. Broadly, the two main purposes are:
1) To ensure that any given subscriber cannot accidentally cause service quality failure by requesting more simultaneous services then can be supported on their network connection (including multiple instances of a single service such as multiple simultaneous video channels, multiple services, eg. VoIP/Video-telephony, Internet, and video)
2) To allow more graceful service limiting by denying new session setups where the alternative would be wide-scale quality or availability failures for sessions in progress. This is particularly true in the case where there is a long lived but unusual reduction in the available shared capacity to service high bandwidth short-lived sessions.

SAC applies to all services for which a guarantee of throughput is required which typically includes real-time communication services and streaming media services. The guarantee required is normally for a minimum throughput which is to be delivered in every time interval based on the size of the receive client buffer. This can generally be assumed to be a few hundred milliseconds, ie. the minimum rate must be achieved within every 200 ms interval. More rarely, SAC may be applied to other services such as high speed internet access, typically by allowing or denying a request from the user or a $3^{rd}$ party content/application provider to temporarily boost a user's bandwidth to a higher level for a time interval of defined duration.

The first principal purpose or objective of SAC can be called "Subscriber SAC". This first purpose is to allow a service provider to ensure that the services which a customer has purchased are available to them with the required quality. SAC per subscriber may be used to limit the number of service instances allowed per customer to that which the customer has paid for and which can be supported by their connection. This form of SAC is inherently dealing with the first mile/first half mile bottleneck, which is typically defined by a per subscriber access rate. In the case of triple play services (data, voice and video), only two of the three triple play services are session based and performance critical—entertainment video and real-time communications. Of these, only video occupies significant bandwidth. Thus a simple solution to implement subscriber SAC today, is simply to do admission control at an application level on video sessions. VoIP, if present, occupies an insignificant amount of bandwidth and therefore can be safely assumed to be always in use for the purposes of calculating bandwidth available for Video. That is, every service is managed separately, and video on demand and video broadcast are the only ones that really counts from a SAC perspective. A future subscriber SAC requirement is to sell more services to a customer, where those services are occasionally used, and which collectively would use more bandwidth than the physical capacity that exists. For example, it might be that a customer has enough bandwidth for video telephony, or streaming video, but not both at the same time. This is different from the case above, because it is now necessary to coordinate sessions control across more than one service. SAC in this instance allows the service provider to sell the customer both services, as long as the customer understands that they can do one or the other but not both at the same time. (Or in a more nuanced version, it might allow them to do both simultaneously, but not at peak quality levels).

The second principal purpose or objective of SAC can be called "Overload SAC". This second value to SAC is to deal with abnormal-demand load conditions in the shared aggregation network, by denying new session requests where the alternative would have been serious quality failures for the sessions in progress. That is to say, the probability of quality impairment for all customers is reduced by blocking a few customers. For example, if some special live video event was only available by unicast and a very high proportion of subscribers attempted to access the event, then this could cause a peak demand which could not be met. The result might be high levels of packet loss which cause very significant quality degradation and potentially crashed video sessions.

IP Multicast is a particular subset of the streaming entertainment video services which is unique in that the point where a subscriber attaches to a service is normally distributed and has no mechanism for declining a service request. IP Multicast provides a bandwidth effective mechanism for delivery of continuous multimedia streams such as video and audio to a group of receivers across a data network using data replication point(s) close to the receivers from the source.

In the network access segment of an IP network, hosts request a multicast channel from their upstream multicast router usually using the IGMP protocol, although other protocols such as SIP or RTSP, or even XML (Web services) can potentially be used. The first hop (subscriber aggregation) multicast router, most likely an IGMP router or proxy, processes the channel request from its receivers and instantiates required changes, ie. 'Joining' a subscriber to a requested channel or 'Leaving' a channel.

The mechanism that will be described here can be referred to as provider-signaled SAC where a content or application provider (or proxy) sees the request for a service instance and performs a check to verify that the service instance should be allowed. The basic mechanism by which the SAC function should occur is as follows:

1. Customer requests service instance. (This will normally occur automatically as part of service usage; the phone goes off hook and digits are dialed, the Set-top box is turned on and a channel is requested, etc.)
2. Service instance received by server or proxy server. (In the application/service provider domain, not network domain)
3. Service request validated against 'local' subscriber data (eg has the subscriber paid for this type or number of service instances?)
4. Application server generates resource reservation request and sends to a session admission control policy decision point application for validation.
5. The first point at which a decision is made is a local and distributed decision point. This may be functionality built into an application, or alternatively the application may reference a local admission control proxy application (typically running on the same application server) which will be called SAC-M. The latter 'external' SAC-M option allows implementation of the system with minimal application changes. If the functionality is built into the application, this is effectively implementing the SAC-M proxy function in the application; further description will describe this SAC-M as if it is external to the application. SAC-M implemented external to the application also allows the SAC-M to abstract the behavior of the SAC-PDP from the application.
6. If a local distributed decision cannot be made at the SAC-M, then the admission request is passed on to a more centralized admission control decision point known as a SAC-PDP (Session Admission Control Policy Decision Point).
7. Note that the SAC decision may be made in the decentralized SAC-M node, or the centralized SAC-PDP node. The local SAC-M applies local rules, such as 'have I already obtained permission to grant resources within a certain range and is that permission still valid', and also interfaces with the SAC-PDP node when required, such as when an open permission does not exist on the SAC-M.
8. If the request is forwarded to the SAC-PDP, it checks the request against bandwidth already committed and available for that subscriber.
9. SAC-PDP may also check the request against bandwidth already committed and available for the aggregate of which that subscriber is a part. (eg. $2^{nd}$ mile services and BW)
10. SAC-PDP may also check the request against the bandwidth already committed and available for that service type (eg. video service in region x)
11. The bandwidth reservation response is returned to the application server.
12. Application server signals the user with the appropriate functioning service or 'busy tone' equivalent.
13. On application session termination or time-out the application server advises the SAC-PDP to tear down the reservation.

It is possible to enhance the standard multicast subscription process to verify that a host requesting a particular channel is authorized to receive the requested channel and perform a session admission control check to verify that there exist sufficient bandwidth and processing resources for granting the requested channel to the requesting host.

Avoiding congestion through SAC is achieved through comparing the current demand load against the available capacity at each network bottleneck and declining a service request if admitting such a request would overload the bottleneck. Although there may be multiple bottlenecks in series, these can usually be reduced to a simpler set. This is desirable to minimize complexity. Bottlenecks can usually be condensed down to just three:

1) The smallest of all constraints which applies to a single subscriber;
2) A bottleneck which applies to a set of subscribers; and
3) A bottleneck which applies to a service or application type.

Bottlenecks can play a role in the SAC decision making in one of two modes, dimensioned or discovered.

Dimensioned bottlenecks have a management interface by which the relevant bottleneck dimensions can be learned. For example the sync rate of a DSL line can be learned by querying or being told by the DSLAM management system. Dimensioned bottlenecks have a known quantum of bandwidth which may change over time, but relatively infrequently.

Discovered bottlenecks come from a portion of the network which is not directly observable from a management perspective, but whose behavior can be observed and gauged in near real-time.

There are three general approaches to SAC in a packet network: Local limit SAC, Resource reservation based SAC, and measurement based SAC.

Local SAC mechanisms function on the first hop multicast router, gateway, access concentrator or aggregation element. The SAC decision is based on nodal information such as the state of the outgoing LAN or WAN link. If the local packet network link is down, there is no point in executing complex decision logic based on the state of the rest of the network, because that network is unreachable. Local mechanisms include configuration items to disallow more than a fixed number of calls. For example, if the network designer already knows that no more than two multicast channels can fit across the access LAN link because of bandwidth limitations, then local SAC mechanisms allow the designer to configure the local node to allow no more than two multicast channels simultaneously.

Measurement-based SAC techniques look ahead into the packet network to gauge the state of the network in order to determine whether to allow a new call. Gauging the state of the network implies sending probes to the destination IP address (usually the terminating gateway or terminating gatekeeper) that will return to the outgoing gateway with some measured information on the conditions the probe found while traversing the network to the destination. For example from a large enough sample of the delay for different sized packets being transmitted between two nodes the available bandwidth can be inferred In addition, a subscriber's request to initiate a service session is typically evaluated using a set of authorization policies, such as security/authorization policies, and this authorization check precedes or can be considered part of the SAC determination. The subscriber request authorization functionality is explained in detail in U.S. patent application Ser. No. 11/212,870 filed Aug. 29, 2005, the contents of which are incorporated herein by reference.

There is considerable prior art on point-to-point SAC in general, but little for point-to-multipoint sessions. The prior art that is widely used today is based on a local SAC mechanism to limit the number of multicast channels that are allowed per IP interface, or per physical link. This mechanism, known as "IGMP State Limit" is available in most popular multicast routers today and allows a service provider to specify the number of IGMP groups per port and/or per interface to support multicast SAC. Membership requests in excess of the configured limits will not be entered in the IGMP state tables, and traffic for those excess membership requests will not be forwarded. Using this "IGMP State Limit", service providers may preserve the quality of service for all multicast streams on a given port/interface by disallowing new streams to join that would violate the traffic engineered goals. Also, the IGMP State Limit feature provides protection against denial of service (DoS) attacks caused by Internet Group Management Protocol (IGMP) packets.

The "IGMP State Limit" does not allow admission control decisions to span across multiple services, or even across both multicast and unicast video. Even for multicast alone control, the "IGMP State Limit" SAC that is popular today has the following drawbacks:

1—It does not differentiate between high-bandwidth multicast channels, such as high-definition TV, and low-bandwidth multicast channels such as music or text conferencing. A network engineer is left with no option but to assume that all channels are high-bandwidth channels (worst case) when engineering the IGMP State Limit.

2—The "IGMP State Limit" feature provides a SAC for IGMP, but not for multicast subscriptions in general. In some scenarios, SIP and/or RTSP is used to request a multicast channel and there is a need for a SIP SAC in those scenarios. In the future, Web services may be used for multicast channel subscriptions and there will be a need for another SAC to handle them.

3—Existing IGMP SAC features have no way to present to a subscriber the reason for which a subscription is denied. IGMP does not currently provide message formats and error codes for replying to a host after a subscription is denied.

RSVP offers a resource reservation based SAC for point-to-point and point-to-multipoint sessions on a router. Although RSVP offers a point-to-multipoint SAC functionality, it is not typically used with multicast in the access network due to its complexity and limited scalability. It is not popular in multi-service admission control in the access and aggregation networks because it is too complex. RSVP performs end-to-end resource reservation for point-to-multipoint sessions, which is not needed for multicast SAC in the access and aggregation network segments because typically most of the multimedia channels are always forwarded to the access multicast router. RSVP based SAC is very complicated and relies on end-to-end network compliance and interoperability in a way that makes it difficult to deploy reliably in real network deployments.

Both of the above SAC approaches do not react to changes in the active bandwidth available on a DSL (Digital Subscriber Line), for example due to copper outside wiring changes, interference, etc. As the effective available bandwidth changes, the SAC mechanisms described above do not adapt to optimize service delivery with a guaranteed service QoS within the newly changed available bandwidth.

Prior implementations of the SAC functionality have seen limited deployment because they did not address a number of key problems. More specifically, they did not scale well, they had no mechanism for discovering the topology and dimensioning of the network, and they did not allow admission control over multicast sessions. All three of these problems are addressed by this invention.

This invention aims at providing a SAC mechanism for handling multicast channel subscriptions and unicast sessions requests. When deployed in a typically oversubscribed network access segment, an admission control enforcement point such as a multicast router uses this SAC functionality to avoid congesting access links which carry quality of service (QoS) sensitive services. The SAC method described here may evaluate channel requests that would typically adhere to one of the multicast or unicast session establishment protocols: IGMP (Internet Group Membership Protocol), SIP (Session Initiation Protocol), RTSP (Real-Time Streaming Protocol), or Web services SOAP multicast subscription.

SUMMARY OF THE INVENTION

The present invention provides a new interaction mechanism between a requestor such as an application, and a SAC policy node which overcomes SAC scaling issues by minimizing the cases where a SAC decision is required by distributing those decisions to a SAC-M module (which may be part of the requesting application) The SAC-M interfaces to the requestor and applies local decision rules; it also interfaces with the SAC-PDP node for the cases where the decision cannot be made locally. There is also provided a new mechanism by which a network capacity database is populated that does not rely on every (or indeed any) network element manager telling the SAC-PDP node available capacity. Further, there is provided a mechanism by which a multicast replication node becomes an active participant in the SAC decision making, allowing a mix of multicast and non-multicast services to be jointly controlled.

Therefore in accordance with a first broad aspect of the invention there is provided a method of negotiating admission control in a multi-services communications network comprising: sending, by a requesting application, a session request to a distributed session admission control proxy (SAC-M); evaluating, at the session admission control proxy (SAC-M), the session request relative to previously granted resources; and responsive to a determination that previously granted resources are available, granting the requesting application a resource reservation sufficient to satisfy the session request.

In accordance with a more specific aspect there is provided a method of negotiating admission control in a multi-services communications network, the multi-services including multicast services, the method comprising: sending, by a requesting application, a session request to a distributed session admission control proxy (SAC-M), evaluating, at the SAC-M, the session request relative to previously granted resources; responsive to said SAC-M being unable to grant the session request, sending, from the SAC-M to a Session Admission Control Policy Decision Point (SAC-PDP) the session request; evaluating, at the SAC-PDP the session request relative to available resources; and responsive to a determination by the SAC-PDP that resources are available, granting the requesting application a resource reservation sufficient to satisfy the session request.

According to this aspect, the SAC-M functionality may be embedded directly into the application or kept as a separate module. The main purpose of the SAC-M functionality is to abstract the interaction with the SAC-PDP and provide a simple Application Program Interface (API) to the application In accordance with a further aspect of the invention there is provided a method of calculating bandwidth capacity in a multi-services communications network having a Session Admission Control (SAC) node to negotiate admission of requested sessions from a requesting application, the method comprising: determining existing provisioned capacity of the network; monitoring traffic at a monitoring node in the network; and combining provisioned capacity and monitored traffic data with capacity information obtained through a route-based discovery mechanism to provide an estimation of available capacity.

In accordance with a still further aspect of the invention there is provided a method of calculating bandwidth capacity in a multi-services communications network having a Session Admission Control proxy node (SAC-M) to negotiate admission of requested sessions from a requesting application, wherein SAC-M nodes, if not explicitly informed of resource requirements by the requesting application, estimate the bandwidth needed for a multicast session by actively learning, through observation of bandwidth occupied by channels, the bandwidth needed.

Systems for implementing the above methods are also provided.

BRIEF DESCRIPTION OF THE DRAWINGS

The invention will now be described in greater detail with reference to the attached drawings wherein.

DETAILED DESCRIPTION OF THE INVENTION

Figure 1:
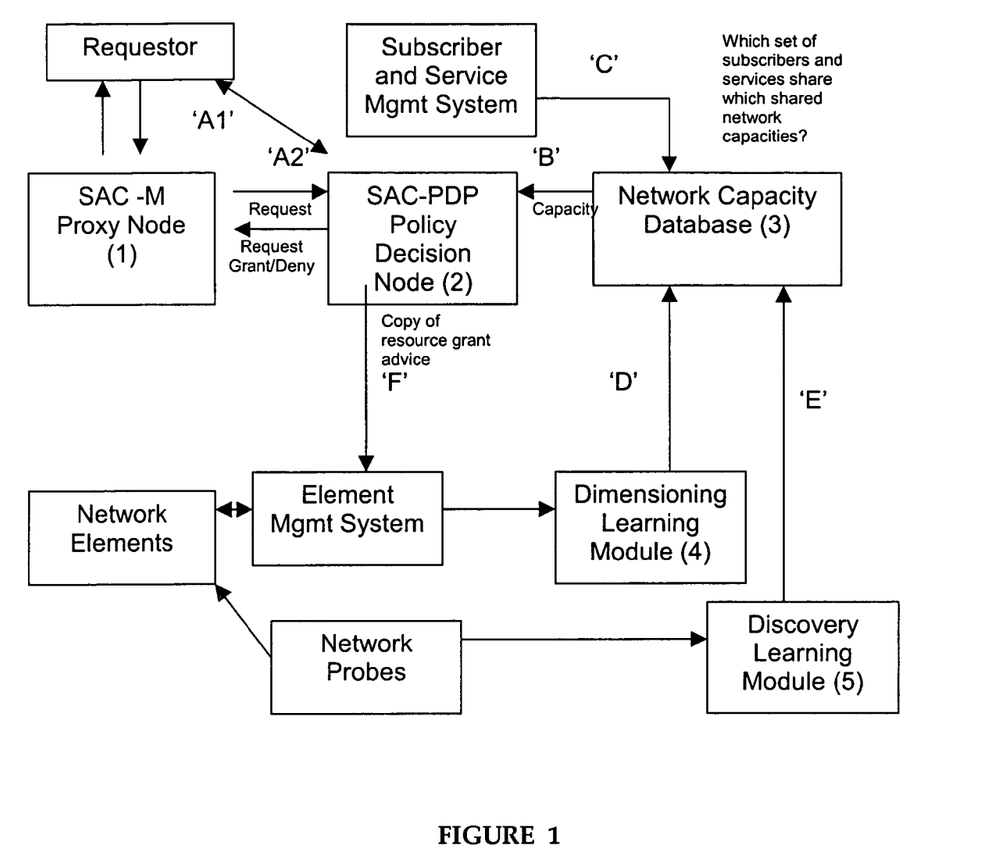
FIG. 1 is a high level block diagram of the components of the present invention.

FIG. 1 illustrates specific components of the session admission control system. These include:

a SAC-M admission proxy node 1 (This could be an external SAC-M, or an application incorporating SAC-M functionality);
SAC policy decision node 2;
network capacity database 3;
dimensioning learning function 4;
discovery learning function 5; and
an interface 'A', designated by Interfaces 'A1' and 'A2'

The 'A' interface is located between an application/service requesting admission and the SAC-M node 1 or SAC-PDP policy decision node 2 which grants or denies that request. The protocol for this interface is optionally based on SIP (Session Initiation Protocol) and uses extensions to its syntax for communication; web services or other protocols may serve the same function.

There are two communicating entities, the requester, and the SAC node (1 or 2). A requestor may request a session where it is not itself involved in the communication. For example, a content provider could request a video on demand movie session to be established from a local video caching server to an end customer even though it is not at either end of the session.

The message that the SAC-M node 1 sends the SAC-PDP node 2 across interface A2 will have the following format:
Request ID
Flow template (How will I know this session when I see it?)
Credentials (How do I know you are who you say you are?)
Request
   Service Type {Requestor assigned Priority}
   Bandwidth {Min/committed}, {Max/burst}
   Exceed action (Policy, Shape {depth})
   Duration {seconds, infinite}
Optionally the request may also contain a 'fallback' request, ie. what lower level of resource grant would be acceptable if the full request cannot be satisfied.
The request that the requestor sends to the SAC-M node may be simplified, in that the SAC-M node may insert locally relevant knowledge; for example the requestor might request a 'standard definition video on demand movie session', which the SAC-M node translates to a 2.5 Mbit/s channel with a duration of 2 hours.

The flow template is generally a 5-tuple (Source and destination IP address, Source and destination port, protocol) description of the session which may include wildcards (typically for port and protocol).

Two forms of request do not themselves establish a resource reservation, but they affect the way in which future resource requests are handled. If the source is specified but the destination is wildcarded this is called a 'VIP pass' request; this source (subscriber) gets premium treatment to all destinations. That is, even a low priority session from this subscriber will be admitted in preference to high priority sessions from other subscribers. While this does not provide useful discrimination by service/application type, it may have its roles. For example emergency response personnel might get a VIP pass such that their traffic of whatever type always receives preferential treatment. Constraints must apply to the number of VIP passes granted, as excessive granting of VIP passes could compromise the ability to assure quality of individual services.

If the source is wildcarded but the destination is specified, this is called a 'Box seat' request; this destination gets premium treatment from all subscribers. That is to say, resource requests on behalf of other requestors will be refused before box seat requests, or indeed other sessions in progress might even be dropped to allow a Box Seat-session to be established. This might be used by a service provider to discriminate between content and application providers with whom it has formed special business relationships. Constraints must apply to the number of Box Seat passes granted, as excessive granting of Box Seat passes could compromise the ability to assure quality of individual subscribers.

A further request type for use under failure recovery conditions will be to 'tell me all live grants'. This would be in the event that a SAC-M node restarts and loses its memory of the resource reservation status, request will allow it to resynchronize. A reverse query from the SAC-PDP node to the application/service nodes will also exist.

Given a request, the SAC-PDP node compares the request to the other sessions that are in progress (it may also consider priority, ie. a new high priority session can pre-empt an existing low priority session) and the available capacity and decides what to do.

The SAC-PDP node then replies to the request with the following format.

Request ID
Response
   Grant {Season, Game, Expiry_time}
   Grant fallback request {Season, Game, Expiry_time}
   Offer alternate
     Bandwidth {Min/committed}, {Max/burst}
     Exceed action (Policy, Shape {depth}
     Duration {seconds, infinite}
   Deny {reason}

A resource reservation, known herein as a Season ticket grant, gives a resource grant which can be applied by the SAC-M node to multiple sessions as long as they fit within the flow template. For example, when a video session is first established, a season ticket is granted and irrespective of which channels are watched, or what on demand content, or indeed no content at all, the reservation will remain valid. A season ticket minimizes the need for the requestor to request resource reservations of the SAC-PDP node. In an un-congested network all service requests will be given season tickets and the steady state load on the SAC-PDP node server will be nearly zero. This overcomes one of the two most fundamental problems of introducing a SAC mechanism, namely scaling to high session set-up rates. (The 'bandwidth discovery' mechanism, to be discussed later, deals with the other principal problem). A season ticket will generally be requested at the highest resource level that any of the constituent 'game' session will require. So if a TV is viewing both high definition and standard definition content then a high definition season ticket will be requested.

As with other true policy based solutions that distribute the decision making, the grant of a season ticket also makes the network more robust, because each local application whose associated SAC-M node has a ticket can continue to offer services even if the centralized SAC-PDP node is unavailable. In the case of a season ticket, they can even start new sessions within the resource level previously granted.

A Game Ticket grant gives a resource grant which applies only for the duration of a given session, say a video on demand movie viewing. On termination of the session, the grant expires or is cancelled and new requests must be made to the SAC-PDP node. Game tickets would be granted only when there is an expectation that some sessions may be denied because a bottleneck has nearly been reached.

In order to facilitate rapid switching between service types, the SAC-M node must also perform an explicit resource release. For example, when a set-top box switches from a multicast subscription to a separately managed unicast video on demand (VoD) stream, the set-top box via a SAC-M node must send a 'Release' message to the SAC-PDP node, so that when an unrelated 'Request' message arrives from the VoD server, the resources are marked as uncommitted. Note that this is not required in all cases. For example in Microsoft's current IPTV solution the initiation of both unicast and multicast traffic streams are controlled by the video server through the 'instant channel change' mechanism.

In addition to responding to the requester, the SAC-PDP node may also advise other nodes (Interface 'F') in the network that a ticket (resource reservation) has been granted. This will allow other nodes in the network to adjust QoS parameters to cope with the changed service mix. For example, a service provider might want to adjust the shaping parameters applied to a high speed internet service to reflect how many video channels are in use by that subscriber. When less video is in use, high speed internet gets more bandwidth. This advice might be useful because a platform deeper in the network (the shaper, for example) can give a more graceful response to the changed service mix than attempting to deliver large amounts of data to the bottleneck point (Eg. A DSLAM) which then just polices the traffic to a lower rate (drops all excess packets).

The advice given to other nodes by the SAC-PDP node may be in the following form:

Grant Advice ID
Flow template (Who got the grant?)
Grant {Season, Game, Expiry_time}
   Bandwidth {Min/committed}, {Max/burst}
   Exceed action (Policy, Shape {depth}

The SAC-PDP node can also issue its own communications to requestors unprompted, typically when a network disturbance makes it impossible to sustain the required quality without load shedding.

Unprompted messages from the SAC-PDP node to the SAC-M node include the following forms:

Downgrade season ticket to game ticket.
Typically because services are nearing a per subscriber bottleneck Downgrade all season tickets to game Tickets {Reason}
Typically because a service/application bottleneck is being neared.

Downgrade set of subscriber season tickets to game tickets.
Typically because services are nearing a set-of-subscriber bottleneck (Eg second mile).

Downgrade seats request {ID, Scope, Reason}
This is different from revoking a ticket. It is asking the SAC-M node associated with an application/service provider to voluntarily cut bandwidth by converting customer from high bandwidth service variants to low bandwidth version to avoid a shared-bottleneck congestion incident. It is a form of lower impact load shedding. Scope is a set (from one to all) of the source/destination pairs to which the downgrade applies. If the downgrade request is not honored, service impairment may occur. The SAC-M node associated with an application/service provider responds to indicated whether it will honor the downgrade request.

Revoke Tickets request {ID, Scope, Reason}
This command is strictly for failure conditions. It is asking the application/service provider to voluntarily shed load by terminating existing sessions. Scope is a set (from one to all) of the source/destination pairs to which the ticket revoke applies. If the ticket-revoke request is not honored than service impairment may occur. The application/service provider responds to indicated whether it will honor the ticket revoke request Where the response to a request is 'Deny', the calling module could be an authorization module such as the one described in previously filed U.S. patent application Ser. No. 11/212,870 which then presents an explanation to the user with a reason for the subscription failure.

There are two conditions which will trigger a policy decision by the SAC-PDP node 2. The first is the reception of a resource request, and the other is the reception of a capacity update.

In the first of these conditions the SAC-PDP node will make decisions on individual admission control requests based on a comparison of the requested resource against the available capacity. This decision making function can be described in the form of conditional rules, eg:

If current sub load+request<available per sub capacity

AND

If current sub_aggregate load+request<available sub-_aggregate capacity

AND

If current service load+request<available service capacity

THEN

Grant Season Ticket.

Season Ticket grant is the default behavior, because it offloads decision making to the SAC-M node associated with the application/service resource requestor. The SAC-M node can allow any service to proceed as long as it fits within the bounds of the season ticket without querying the SAC-PDP node. This means that the SAC-PDP node deals almost exclusively with making decisions where there is a possibility of saying no; it does not have to make decision for the usual situation where there is not a problem allowing the service to proceed. Various permutations of these rules can be created to cope with conditions such as nearing capacity limits.

The mechanism is identical if the requester is a multicast replication point. Upon reception of a multicast channel subscription request (IGMP,SIP, or XML/SOAP), the multicast (IGMP/SIP/SOAP) router estimates the channel bandwidth requirement, and the local SAC-M node associated with multicast service checks for a season ticket that satisfies the required bandwidth, and requests from the SAC-PDP node the required BW only if no season ticket is currently available to cover this service request.

Any point in the network (eg. A residential gateway) may host a SAC-M proxy server function and act as an enforcement point to allow a session if a season ticket exists, or to request a ticket if it does not.

The other condition that triggers action by the SAC policy decision node is receipt of an update notification from the Network Capacity database. A change in network capacity could occur:

1) Because of provisioning or re-arrangements which change the set of subscribers or services which are carried through a common network element or link which is a potential bottleneck;
2) A change in available capacity per subscriber due to changes in the physical access network in the first mile, such as DSL line re-synchronization or improved signal to noise ratio over a wireless link;
3) A change of available capacity share among multiple subscribers and services due to augmentation, or failure, or congestion, or repartitioning of available bandwidth at L1; or
4) A change in available capacity per service due to link failure or service specific node limitations (eg. Maximum calls or bandwidth through a session border controller)

Admission control will apply to a 'middle tier' of applications such as VoIP and Entertainment video. Below this are 'guaranteed' services which are not subject to admission control because they simply are allocated a chunk of the available bandwidth. Private data networking services will generally fall into this category. They will simply subtract the guaranteed portion of their bandwidth from the available capacity for SAC calculation purposes. Distribution of multicast signals via static IGMP entries to downstream multicast distribution nodes is another example of capacity which is 'committed' and unavailable for inclusion in SAC controlled services.

On the other side of the SAC controlled services will be those for which no specific performance guarantees are offered, such as ordinary internet access. Note however that some service providers may choose to differentiate internet access offerings by creating performance guarantees which mean that some bandwidth will need to be reserved and the setup of such differentiated services will therefore be subject to admission control.

In many standard SAC implementations there is only one way that the SAC node knows what the network looks like; another system or person has to tell it the topology (who is putting traffic over which network elements) and dimensioning. This can still be the best way of learning the available capacity for certain points in the network which have a small amount of capacity data which changes infrequently. What has typically stopped more complex implementations however is the inability of the SAC point to learn about the rest of the network, especially which subscribers and services share which network assets, and how much capacity is available across multiple hops through heterogeneous aggregation networks.

This later problem can be addressed through complementing 'provisioned' capacity information with 'discovery' based information.

The first and simplest mechanism, which can always exist as the fall back, is point performance monitoring. For example there may be a point in the network which is observing RTP streams and extracting packet loss, delay, and jitter metrics and exporting them to the SAC point. The SAC point does not know how much capacity exists, but it knows when it has run out. The decision policy therefore is to grant admission request until it sees signs of trouble, learn from this the 'implied capacity' and then back-off quickly to a slightly lower level. This approach has the virtue of having the admission control mechanism respond directly to the problem to be avoided; SAC never denies an admission request when bandwidth was really available, and SAC never grants one when capacity is limited. Furthermore, no management system integration is required, and it will work across any type of network.

However this approach may produce quality 'transients' as the system learns the capacity of the bottleneck. Also short lived capacity problems can force the system to 'learn' a much smaller bottleneck than is optimal. For this latter reason, the system must periodically or on demand test for the ability to expand the implied bottleneck and recalibrate, much like the TCP protocol periodically retests for higher capacity being available. The tuning of this discovery mechanism will be specific to different technologies. For example wireless (especially in un-licensed spectrum) and mobile access technologies are prone to variable throughput, loss, and latency which may change very rapidly from moment to moment. It will in general not be practical to rediscover and track this changing constraint for admission control purposes. DSL lines on the other hand, maintain a given sync rate for long periods of time and only re-train under significantly changed conditions.

The second mechanism for capacity discovery is via network probes. These probes can estimate 'Effective available bandwidth'. The SAC-M node has the mean to estimate the effective bandwidth between a network probing point and another IP destination available to a given Class of Service (CoS). There are multiple methods for effective available bandwidth estimation. Most of these methods rely on measuring the Round-Trip-Times (RTT) of different size packets to estimate the available bandwidth in real-time to a destination. The estimates obtained from these probes will have error associated with them, and the adjustment of the estimated available capacity will therefore take a long-term weighted average of such measures, with outliers eliminated, and all results 'sanity tested' before incorporation in the adjusted capacity estimate.

Figure 2:
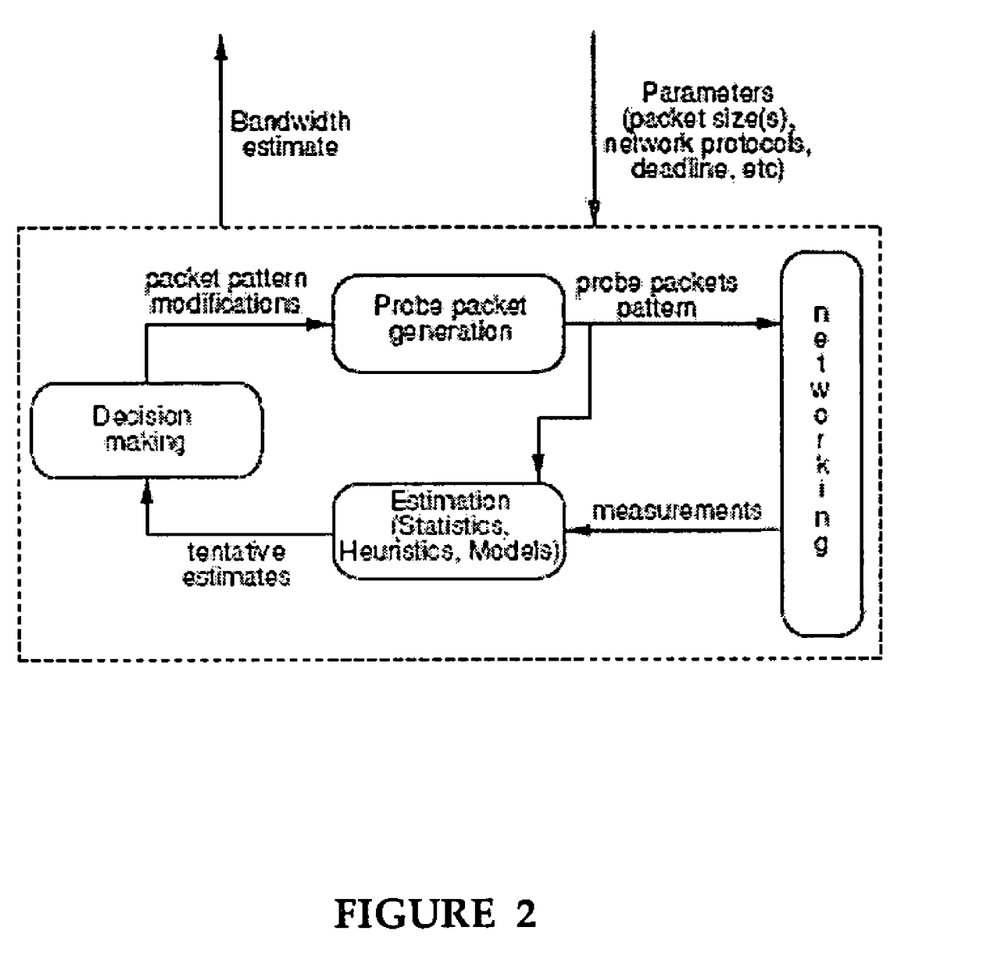
FIG. 2 illustrates an active bandwidth estimation technique.

This second mechanism in a bandwidth estimation module is depicted in FIG. 2. Two main stages are identified: measurement and estimation. Measurement involves the generation of a probe packet pattern, its transmission through the network, and its reception and measurement. Estimation comprises statistical and heuristic processing of measurements according to some network model. The probe packet generation component generation of packet trains. There are many bandwidth estimation methods that may be categorized into two models: the packet gap model and the packet rate model. See for example: Prasad, R. S., Murray, M., Dovrolis, C., Cla_y, K.: Bandwidth estimation: metrics, measurement techniques, and tools. IEEE Network Magazine (2003) http://www.cc.gatech.edu/fac/Constantinos.Dovrolis/publications.html and Strauss, J., Katabi, D., Kaashoek, F.: A Measurement Study of Available Bandwidth Estimation Tools. In: ACM SIGCOMM Internet Measurement Workshop. (2003) http://www.icir.org/vern/imc-2003/program.html.

A non-intrusive bandwidth estimation algorithm is selected based on two metrics that are important in our case: accuracy and mean execution time or response time.

The third discovery mechanism is based on routing based communication. For example OSPF-TE can be used to advertise router bandwidth. By snooping the OSPF message stream, the SAC node can determine route capacities, at least through the IP aware portion of the network.

The combination of 'provisioned' capacity information with the point performance measurement, probe based, and routing based discovery mechanisms allows the SAC to implement multiple 'triangulation' points to arrive at a stable and reliable estimate of available capacity.

Figure 3:
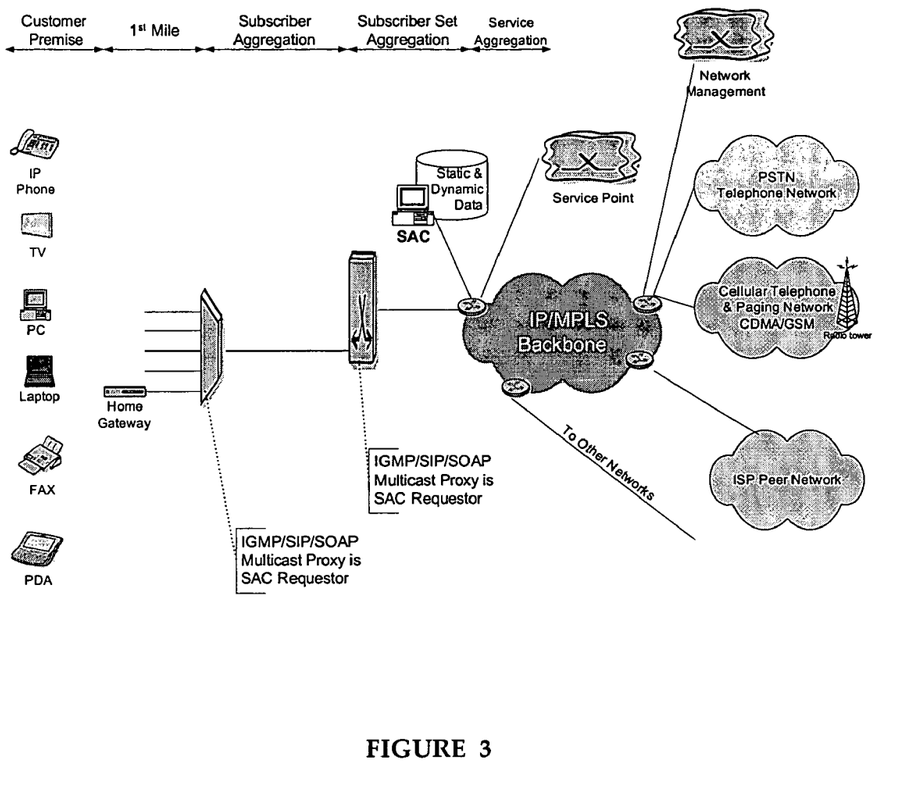
FIG. 3 illustrates a multi-service network model according to one aspect of the invention.

FIG. 3 shows a reference multi-service network that is similar to real-world networks typically deployed for delivery triple-play services. The IGMP/SIP/SOAP multicast proxy in the access and aggregation networks act as Requestors to the SAC node. Typically, multicast channels are subscribed to using static IGMP, by the access and aggregation multicast routers to reduce the channel change time observed by a TV service subscriber. The purpose of the SAC node in the access multicast router is to ensure that there exists enough available bandwidth on the access link (1st mile) before sending a multicast channel to a requesting subscriber. The purpose of the SAC node in the aggregation multicast router is to ensure that there exists enough available bandwidth on the aggregation link (2nd mile) before sending a multicast channel to a requesting DSLAM. Sending a real-time multicast channel to a requesting subscriber on a link that does not have sufficient bandwidth disrupts other real-time services of equal or lower priority (or Class of service) and delivers an impaired multicast signal to the subscriber.

A multicast router is capable of identifying a multicast channel by its source and destination IP addresses in an IP network/VPN. If XML multicast routing is used, then the multicast channel is identified with its topic.

There are two methods that are available to the SAC nodes for estimating the bandwidth needed for a multicast channel.

1—The first option, which is management intensive, is for the operator to configure the SAC node with classification rules for estimating the bandwidth needed by each multicast channel. The Network Management System may distribute information about channel bandwidth requirements to SAC nodes.

2—The second and more automated option is for the multicast replication point to actively learn the bandwidth needed for multicast channels on the network link (upstream of the router) and feed the learned information to the SAC node.

While particular embodiments of the invention have been described and illustrated it will be apparent to one skilled in the art that numerous changes can be made without departing from fundamental concepts. It is to be understood, however, that such changes will fall within the full scope of the invention as defined by the appended claims.

We claim:

1. A method of negotiating admission control in a multi-services communications network comprising:
   providing to a distributed session admission control proxy (SAC-M) node a previously granted resource information associated with a requesting application;
   storing a local policy for granting resources in the SAC-M node;
   sending, by the requesting application, a session request to the SAC-M node;
   evaluating, at the SAC-M node, the session request relative to the previously granted resource information;
   sending, from the SAC-M node to the SAC-PDP node, the session request;
   evaluating, at the SAC-PDP node, the session request relative to the an available resources information;
   making local decisions regarding whether to allow the session request based on the evaluation related to the stored local policy; and
   responsive to said evaluating indicating that the previously granted resource information is available, granting the requesting application a resource reservation sufficient to satisfy the session request.

2. A method of negotiating admission control in a multi-services communications network, said multi-services including multicast services, the method comprising:
   providing, to a distributed session admission control proxy (SAC-M) node and a Session Admission Control Policy Decision Point (SAC-PDP) node, a previously granted resource information associated with a requesting application;
   sending, by the requesting application, a session request to the SAC-M node,
   evaluating, at the SAC-M node, the session request relative to the previously granted resource information;
   responsive to said evaluating indicating said SAC-M node being unable to grant the session request, sending, from the SAC-M node to the SAC-PDP node, the session request;

evaluating, at the SAC-PDP node, the session request relative to an available resources information; and responsive to the evaluating at the SAC-PDP node relative to the available resources information, granting the requesting application a resource reservation sufficient to satisfy the session request.

3. The method of claim 2, wherein a SAC-M function is embedded in the requesting application.

4. The method of 2, wherein the available resources information indicates other sessions currently in progress and, based on said available resources information, said SAC-PDP node evaluates the session request relative to the other sessions currently in progress.

5. The method of claim 4, wherein the evaluating at the SAC-PDP node includes the SAC-PDP node assessing a session priority of a session requested by said session request, assessing a priority of a session in progress, identifying a session duration and a bandwidth requested by said session request, and identifying an available network bandwidth and wherein said granting the requesting application admits some session requests and declines other session requests based on said assessing of the priority of the session in progress priority, the requested bandwidth, the available network bandwidth, and the identified session duration.

6. The method of claim 5, wherein the evaluating at the SAC-PDP node further comprises:
the SAC-PDP node identifying at least one of an application type and a service type associated with the session request, and establishing a higher session priority based on one of the application type and the service type.

7. The method of claim 6, wherein the evaluating at the SAC-PDP node further comprises:
the SAC-PDP node identifying a subscriber associated with the session request and wherein the higher session priority is established by the subscriber associated with the session request.

8. The method of claim 6, wherein the evaluating at the SAC-PDP node further comprises:
the SAC-PDP node identifying a source of a requested traffic associated with the session request, wherein the source of the requested traffic is one of a content provider and an application provider, and wherein the higher session priority is established by the source of the requested traffic.

9. The method of claim 2, wherein the evaluating at the SAC-PDP node further comprises:
the SAC-PDP node withdrawing the resource reservation for other sessions currently in progress in favor of a new session request having a higher priority.

10. The method of claim 2, wherein the evaluating at the SAC-PDP node further comprises:
the SAC-PDP node identifying availability of intermediate resources, including a resource reservation with a lower quantity of resources than requested, and a resource reservation with a fallback to a less resource intensive request reservation, and, wherein responsive to a determination by the SAC-PDP node that the intermediate resources are available, granting the requesting application at least one of the intermediate resources.

11. The method of claim 2, further comprising:
updating to the SAC-PDP node of the available resources information, wherein the granting of the resource reservation includes maintaining the resource reservation valid, based on said updating for future session requests as long as the available resources information indicates resources are available.

12. The method of claim 2, wherein responsive to said evaluating indicating said SAC-M node is able to grant the session request, the SAC-M node grants the resource reservation.

13. The method of claim 2, wherein the granting of the resource reservation grants the resource reservation to be valid only for a defined duration.

14. The method of claim 2, wherein the granting of the resource reservation grants the resource reservation to be valid until terminated by an end of a session.

15. The method of claim 2, further comprising:
updating, to the SAC-PDP node, the available resources information; and
detecting, at the SAC-PDP node, a change in available capacity based on said available resources information, wherein the granted resource reservation is valid until revoked by the SAC-PDP node based on the detected change in the available capacity.

16. The method of claim 3, further comprising:
the requesting SAC-M node associated with an application detecting a termination of a session and, in response to the detecting, sending to the SAC-PDP node a resource release message on the termination of the session; and
the SAC-PDP node, in response, releasing resources to be available to serve other session requests.

17. The method of claim 2, wherein the SAC-M node is a multicast replication point.

18. The method of claim 12, wherein the granting at the SAC-M node of the resource reservation further comprises:
the SAC-M node advising other nodes in the multi-service communications network that the resource reservation has been granted.

19. The method of claim 2, further comprising:
the SAC-PDP node issuing unprompted communications to the SAC-M node advising conservation of bandwidth through use of lower bandwidth services; and,
the SAC-M node, in response to receiving said unprompted communications, updating a criterion for determining, based on said evaluating at said SAC-M node, whether said SAC-M node is able or unable to grant the session request.

20. The method of claim 2, further comprising:
the SAC-PDP node detecting a bandwidth shortfall; and
the SAC-PDP node instructing the SAC-M node and application servers associated with the SAC-M node to actively shed load by dropping sessions in progress in order to deal with the detected bandwidth shortfall.

21. The method of claim 2, wherein the session request is made by a third party that is neither a source nor a destination of a session traffic associated with the session request.

22. The method of claim 2, further comprising:
determining existing provisioned capacity of the multi-services communications network;
monitoring traffic at a monitoring node in the multi-services communications network to generate a monitored traffic data;
estimating available capacity, said estimating including:
performing a route-based discovery to generate a capacity information data, and
combining the capacity information data with the determined existing provisioned capacity to generate the estimated available capacity.

23. The method of claim 22, wherein the route-based discovery further comprises:
probing network paths for available effective bandwidth.

24. The method of claim 22, wherein the SAC node uses one or more estimation techniques including the existing provisioned capacity, the monitored traffic data, and route-based discovery mechanism information to arrive at the estimated available capacity.

25. The method of claim 22, wherein a Discovery Learning module listens to a open shortest path first (OSPF) message stream which is used to advertise router bandwidth.

26. The method of claim 22, wherein the SAC node learns the bandwidth capacity at some network bottleneck by a protocol of explicitly signaling the bandwidth capacity.

27. The method of claim 22, wherein the SAC node estimates the bandwidth capacity needed for a multicast session request utilizing an operator assisted configuration involving provision of classification rules.

28. The method of claim 2, further comprising:
   determining, at the SAC-M node, whether the session request includes an explicit bandwidth request;
   in response to the determining indicating the session request does not include the explicit bandwidth request, estimating at the SAC-M node the bandwidth capacity needed for a multicast session, said estimating including actively learning based on an observing of bandwidth occupied by channels.

29. A system for negotiating admission control in a multi-services communications network comprising:
   a distributed session admission control proxy (SAC-M) node that receives session requests from a requesting application, receives a previously granted resource information associated with the requesting application, and evaluates the session requests relative to the previously granted resource information to determine whether to grant the session request;
   and
   a centralized session admission control decision point (SAC-PDP) node that receives the previously granted resource information associated with the requesting application, receives the session request from the SAC-M node responsive to an evaluation that the SAC-M node is unable to grant the session request, evaluates the session request relative to an available resources information, and grants the requesting application a resource reservation sufficient to satisfy the session request responsive to the evaluation relative to the available resources information.

30. The system of claim 29, further comprising:
   a Network capacity database that holds information characterizing possible network resources for potential granting;
   a Dimensioning Learning module that receives information characterizing deliberate changes to the possible network resources, and updates the Network capacity database in response; and
   a Discovery Learning module that receives information reflecting observed traffic on the multi-services communications network and updates the Network capacity database in response.

31. The system of claim 30, wherein a functionality of the SAC-M node is embedded in the requesting application.

32. The system of claim 30, wherein the resource grants held by the SAC-M node are valid until a session ends.

* * * * *

UNITED STATES PATENT AND TRADEMARK OFFICE
CERTIFICATE OF CORRECTION

PATENT NO. : 7,792,025 B2
APPLICATION NO. : 11/246285
DATED : September 7, 2010
INVENTOR(S) : Jonathan Dean Segel and Bashar Said Bou-Diab It is certified that error appears in the above-identified patent and that said Letters Patent is hereby corrected as shown below:

Column 15, Claim 5, lines 22-23, please delete "priority"

Signed and Sealed this

Nineteenth Day of October, 2010

David J. Kappos
*Director of the United States Patent and Trademark Office*